US012718586B2

(12) United States Patent
Ra et al.

(10) Patent No.: US 12,718,586 B2
(45) **Date of Patent: *Aug. 25, 2026**

(54) APPARATUS FOR CONTROLLING VEHICLE AND METHOD THEREOF

(71) Applicants: Hyundai Motor Company, Seoul (KR); Kia Corporation, Seoul (KR)

(72) Inventors: Ju Hyeok Ra, Guri-si (KR); Yoon Suk Jang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 126 days.

This patent is subject to a terminal disclaimer.

(21) Appl. No.: 18/620,254

(22) Filed: Mar. 28, 2024

(65) Prior Publication Data

US 2025/0086980 A1 Mar. 13, 2025

(30) Foreign Application Priority Data

Sep. 11, 2023 (KR) ........................ 10-2023-0120570

(51) Int. Cl.
*G06V 20/58* (2022.01)
*G06T 7/20* (2017.01)
(Continued)

(52) U.S. Cl.
CPC ................ *G06V 20/58* (2022.01); *G06T 7/20* (2013.01); *G06T 7/62* (2017.01); *G06T 17/00* (2013.01);
(Continued)

(58) Field of Classification Search
CPC .. G06V 20/58; G06V 10/761; G06V 2201/07; G06V 20/56; G06T 7/20;
(Continued)

(56) References Cited

U.S. PATENT DOCUMENTS

2014/0085545 A1* 3/2014 Tu ......................... G06F 18/254 348/E9.047
2019/0080601 A1* 3/2019 Kawabe ................. G06V 20/58
(Continued)

FOREIGN PATENT DOCUMENTS

EP 4215943 A1 * 7/2023 ........... G01S 13/931
KR 10-2023-0124252 A 8/2023

*Primary Examiner* — Jamie J Atala
*Assistant Examiner* — Mahmoud Kamal Abouzahra
(74) *Attorney, Agent, or Firm* — Banner & Witcoff, Ltd.

(57) ABSTRACT

An apparatus for vehicle control is introduced. The apparatus includes a sensor and a processor configured to generate a tracking box based on a virtual box obtained from the sensor at a first time point, converting it to a second time point, and determine virtual boxes associated with the tracking box from a set of virtual boxes at the second time point, derived from sensor data. The processor decides whether to merge some or all of these virtual boxes based on their inter-distances, whether any virtual box corresponds to an object separated from a road edge, or if they are contained within the tracking box. The merging process is controlled based on the resulting merge box size, the difference from the size based on the identified virtual boxes, or the object type. The apparatus outputs a signal to indicate the outcome of this controlled merging.

20 Claims, 8 Drawing Sheets

(51) Int. Cl.
*G06T 7/62* (2017.01)
*G06T 17/00* (2006.01)
*G06V 10/74* (2022.01)

(52) U.S. Cl.
CPC ........ *G06V 10/761* (2022.01); *G06V 2201/07* (2022.01)

(58) Field of Classification Search
CPC G06T 7/62; G06T 17/00; G06T 7/246; G06T 2207/30261; B60W 40/02; B60W 60/001; B60W 2420/408; B60W 2552/50; G01S 7/4808; G01S 17/931; G01S 17/894
USPC .......................................................... 348/148
See application file for complete search history.

(56) References Cited

U.S. PATENT DOCUMENTS

2019/0213406 A1* 7/2019 Porikli ................. G06V 20/597
2022/0126873 A1* 4/2022 Alghanem ...... B60W 60/00276
2023/0266468 A1 8/2023 Jang et al.
2025/0086807 A1* 3/2025 Ra ............................ G06T 7/11
2025/0086981 A1* 3/2025 Ra ........................... G06T 17/00

* cited by examiner

VEHICLE CONTROL APPARATUS
100

PROCESSOR
110

LIDAR
120

FIG 1

APPARATUS FOR CONTROLLING VEHICLE AND METHOD THEREOF

CROSS-REFERENCE TO RELATED APPLICATION

This application claims the benefit of priority to Korean Patent Application No. 10-2023-0120570, filed in the Korean Intellectual Property Office on Sep. 11, 2023, the entire contents of which are incorporated herein by reference.

TECHNICAL FIELD

The present disclosure relates to a vehicle control apparatus and a method thereof, and more particularly, relates to a technology for using a sensor (e.g., light detection and ranging (LiDAR)).

BACKGROUND

Various studies are being conducted to identify an external object by using various sensors to assist a host vehicle in driving.

In particular, while the host vehicle is driving in a driving assistance device activation mode or an autonomous driving mode, the external object may be identified by using a LiDAR.

In a process of merging virtual boxes generated by using the LiDAR, the virtual boxes may be merged incorrectly. If a merge box, which is obtained by incorrectly merging the virtual boxes, is mapped to an external object, the type, state, or size of the external object may be incorrectly identified. If the type, state, or size of an external object is incorrectly identified, a driving route of a host vehicle may change dramatically or incorrectly.

SUMMARY

According to the present disclosure, an apparatus for controlling a vehicle, the apparatus may comprise a sensor, and a processor, wherein the processor is configured to generate, based on obtaining a virtual box corresponding to an object at a first time point through the sensor, a tracking box by converting the virtual box to a virtual box at a second time point after the first time point, determine virtual boxes associated with the tracking box among a plurality of virtual boxes at the second time point, based on obtaining the plurality of virtual boxes at the second time point formed by a plurality of points obtained at the second time point through the sensor, merge all or part of the determined virtual boxes based on at least one of a distance between the plurality of virtual boxes at the second time point, whether at least one of the plurality of virtual boxes at the second time point corresponds to an object separated from a road edge, or whether the plurality of virtual boxes at the second time point are included in the tracking box, and control the merging based on at least one of a size of a merge box generated by the merging, a difference between the size of the merge box and a size based on the determined virtual boxes, or a type of the object, and output a signal indicating the controlled merging.

The apparatus, wherein the processor is configured to determine the virtual boxes associated with the tracking box among the plurality of virtual boxes at the second time point further based on the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance.

The apparatus, wherein the processor is configured to determine a stationary state or a moving state of the object based on the object being unobstructed, the type of the object being determined as a third type different from a first type including a specialty vehicle, and a number of the plurality of virtual boxes at the second time point being smaller than a specified number.

The apparatus, wherein the processor is configured to determine that the object is in the stationary state, determine that at least one of a width or a length of the tracking box is greater than or equal to a first reference length, determine a first straight line perpendicular to a line segment forming a first virtual box from a first center point of the first virtual box among the plurality of virtual boxes at the second time point, based on the object being in the stationary state, and at least one of the width or the length of the tracking box being greater than or equal to the first reference length, and skip merging at least a portion of the determined virtual boxes based on a distance between the first straight line and a second center point of a second virtual box among the plurality of virtual boxes at the second time point being greater than or equal to a second reference length.

The apparatus, wherein the processor is configured to determine a virtual box having a first identifier indicating that the virtual box having the first identifier is closest to a vehicle including the apparatus and has a width and a length, each of which is greater than or equal to a third reference length, from among the plurality of virtual boxes at the second time point, determine a virtual box, which has a second identifier indicating an object separated from the road edge, from among the plurality of virtual boxes at the second time point, and skip merging the virtual box having the first identifier and the virtual box having the second identifier.

The apparatus, wherein the processor is configured to determine a virtual box, which does not overlap the tracking box, from among the plurality of virtual boxes at the second time point, and merge part of the determined virtual boxes, excluding the virtual box that does not overlap the tracking box.

The apparatus, wherein the processor is configured to determine at least one of a width of each of the determined virtual boxes or a length of each of the determined virtual boxes, compare a sum of widths of the determined virtual boxes with a width of the tracking box, or compare a sum of lengths of the determined virtual boxes with a length of the tracking box, and skip merging the determined virtual boxes based on the sum of the widths of the determined virtual boxes exceeding the width of the tracking box or the sum of the lengths of the determined virtual boxes exceeding the length of the tracking box.

The apparatus, wherein the processor is configured to cancel at least a portion of the merging based on the size of the merge box being greater than or equal to a first reference size or one of a width and a length of the merge box being greater than or equal to a fourth reference length.

The apparatus, wherein the processor is configured to determine a minimum value on an x-axis, a maximum value on the x-axis, a minimum value on a y-axis, and a maximum value on the y-axis among a plurality of points included in the determined virtual boxes determined on a plane formed by the x-axis and the y-axis, wherein the x-axis is a moving direction of the vehicle and the y-axis is perpendicular to the x-axis, and cancel at least a portion of the merging based on a difference between the size of the merge box and a size of a quadrangle formed by the minimum value on the x-axis, the maximum value on the x-axis, the minimum value on the y-axis, and the maximum value on the y-axis being greater than or equal to a second reference size.

The apparatus, wherein the processor is configured to determine that the object is in a moving state among a plurality of states including a stationary state and the moving state, and the merge box is located in a region in which a specified distance from a boundary of the field of view of the sensor is exceeded. The processor further cancels at least a portion of the merging based on one of the following conditions: a width of the merge box being greater than or equal to a fifth reference length or a length of the merge box being greater than or equal to a sixth reference length when the type of the object is a first type including a specialty vehicle, the width of the merge box being greater than or equal to the fifth reference length and the length of the merge box being greater than or equal to the sixth reference length when the type of the object is a second type including a passenger vehicle, the width or the length of the merge box being greater than or equal to a seventh reference length when the type of the object is a third type including a pedestrian, or the width or the length of the merge box being greater than or equal to the sixth reference length when the type of the object is not determined.

According to the present disclosure, a method for controlling a vehicle, the method may comprise generating, by an apparatus and based on obtaining a virtual box corresponding to an object at a first time point through a sensor, a tracking box by converting the virtual box to a virtual box at a second time point after the first time point, determining virtual boxes associated with the tracking box among a plurality of virtual boxes at the second time point, based on obtaining the plurality of virtual boxes at the second time point formed by a plurality of points obtained at the second time point through the sensor, merging all or part of the determined virtual boxes based on at least one of a distance between the virtual boxes of the second time point, whether at least one of the virtual boxes of the second time point corresponds to an object separated from a road edge, or whether the virtual boxes of the second time point are included in the tracking box, and controlling the merging based on at least one of a size of a merge box generated by the merging, a difference between the size of the merge box and a size based on the determined virtual boxes, or a type of the object, and outputting a signal indicating the controlled merging.

The method, wherein the determining the virtual boxes associated with the tracking box among the plurality of virtual boxes at the second time point is further based on the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance.

The method may further comprise determining a stationary state or a moving state of the object based on the object being unobstructed, the type of the object being determined as a first type including a pedestrian, and a number of the plurality of virtual boxes at the second time point being smaller than a specified number.

The method may further comprise determining that the object is in the stationary state, determining that at least one of a width or a length of the tracking box is greater than or equal to a first reference length, determining a first straight line perpendicular to a line segment forming a first virtual box from a first center point of the first virtual box among the plurality of virtual boxes at the second time point, based on the object being in the stationary state, and at least one of the width or the length of the tracking box being greater than or equal to the first reference length, and skipping merging at least a portion of the determined virtual boxes based on a distance between the first straight line and a second center point of a second virtual box among the plurality of virtual boxes at the second time point being greater than or equal to a second reference length.

The method may further comprise determining a virtual box having a first identifier indicating that the virtual box having the first identifier is closest to a vehicle having a width and a length, each of which is greater than or equal to a third reference length, from among the plurality of virtual boxes at the second time point, determining a virtual box, which has a second identifier indicating an object separated from the road edge, from among the plurality of virtual boxes at the second time point, and merging the virtual box having the first identifier and the virtual box having the second identifier.

The method may further comprise determining a virtual box, which does not overlap the tracking box, from among the plurality of virtual boxes at the second time point, and merging part of the determined virtual boxes, excluding the virtual box that does not overlap the tracking box.

The method may further comprise determining at least one of a width of each of the determined virtual boxes or a length of each of the determined virtual boxes, comparing a sum of widths of the determined virtual boxes with a width of the tracking box or comparing a sum of lengths of the determined virtual boxes with a length of the tracking box, and merging the determined virtual boxes based on the sum of the widths of the determined virtual boxes exceeding the width of the tracking box or the sum of the lengths of the determined virtual boxes exceeding the length of the tracking box.

The method may further comprise canceling at least a portion of the merging based on the size of the merge box being greater than or equal to a first reference size, or one of a width and a length of the merge box being greater than or equal to a fourth reference length.

The method may further comprise determining a minimum value on an x-axis, a maximum value on the x-axis, a minimum value on a y-axis, and a maximum value on the y-axis among a plurality of points included in the determined virtual boxes determined on a plane formed by the x-axis and the y-axis, wherein the x-axis is a moving direction of the vehicle and the y-axis is perpendicular to the x-axis, and canceling at least a portion of the merging based on a difference between the size of the merge box and a size of a quadrangle formed by the minimum value on the x-axis, the maximum value on the x-axis, the minimum value on the y-axis, and the maximum value on the y-axis being greater than or equal to a second reference size.

The method may further comprise determining that the object is in a moving state among a plurality of states including a stationary state and the moving state, and the merge box is located in a region in which a specified distance from a boundary of field of view of the sensor is exceeded, and canceling at least a portion of the merging based on one of a width of the merge box being greater than or equal to a fifth reference length or a length of the merge box being greater than or equal to a sixth reference length when the type of the object is a first type including a specialty vehicle, the width of the merge box being greater than or equal to the fifth reference length, and the length of the merge box being greater than or equal to the sixth reference length when the type of the object is a second type including a passenger vehicle, the width or the length of the merge box being greater than or equal to a seventh reference length when the type of the object is a third type including a pedestrian, or the width or the length of the merge box being greater than or equal to the sixth reference length when the type of the object is not determined.

BRIEF DESCRIPTION OF THE DRAWINGS

The above and other objects, features and advantages of the present disclosure will be more apparent from the following detailed description taken in conjunction with the accompanying drawings:

FIG. 1 shows an example of a block diagram of a vehicle control apparatus, according to an example of the present disclosure;

DETAILED DESCRIPTION

Figure 2:
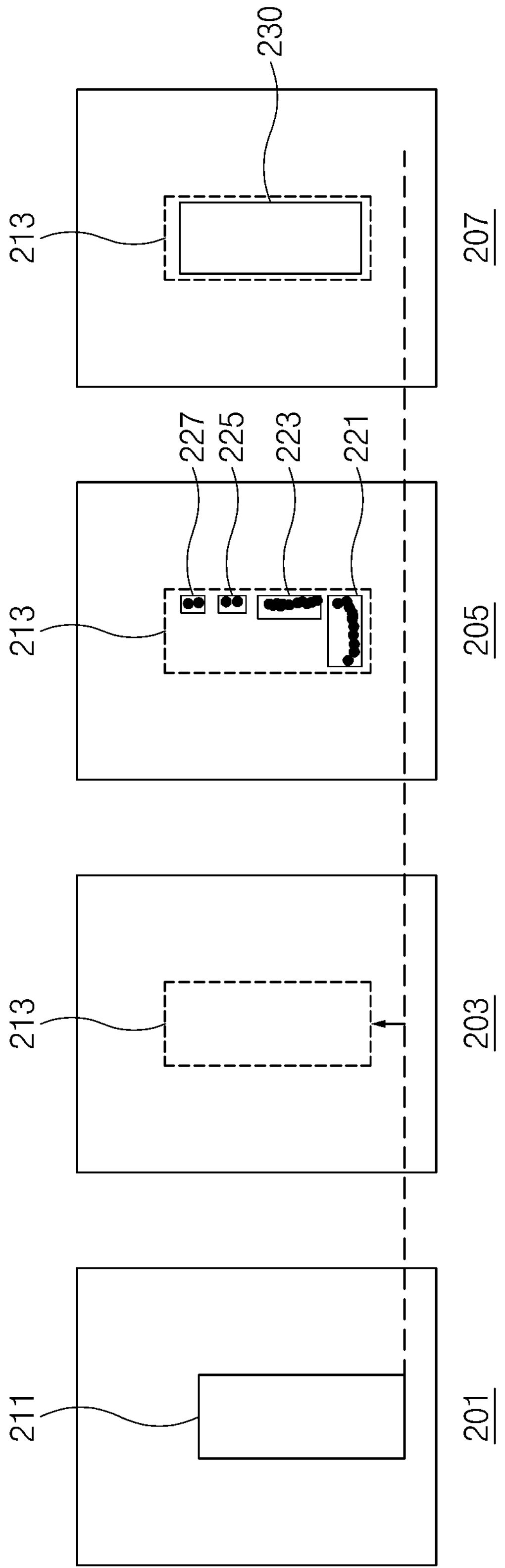
FIG. 2 shows an example of generating a merge box by using virtual boxes, in an example of the present disclosure.

Hereinafter, some examples of the present disclosure will be described in detail with reference to the accompanying drawings. In adding reference numerals to components of each drawing, it should be noted that the same components have the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Figure 1:
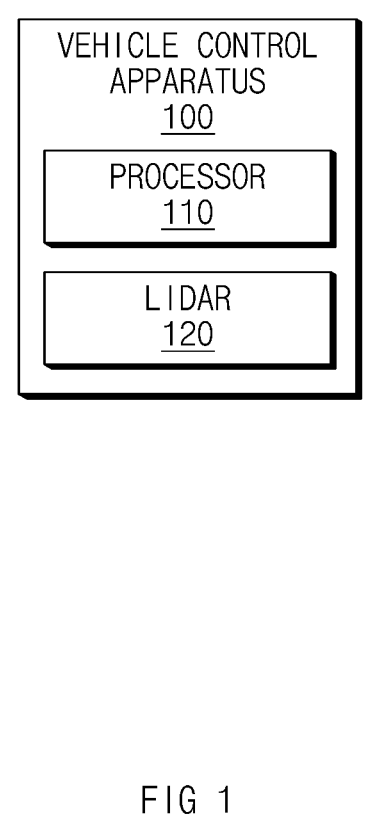

Hereinafter, various examples of the present disclosure will be described in detail with reference to FIGS. 1 to 8.

FIG. 1 shows an example of a block diagram of a vehicle control apparatus, according to an example of the present disclosure.

Referring to FIG. 1, a vehicle control apparatus 100 according to an example of the present disclosure may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be connected to control units of the vehicle by means of a separate connection means. For example, the vehicle control apparatus 100 may further include components not shown in FIG. 1.

Referring to FIG. 1, the vehicle control apparatus 100 according to an example may include a processor 110 and a sensor (e.g., LiDAR 120). The processor 110 or the LiDAR 120 may be electrically or operably connected to each other by an electronic component including a communication bus.

Hereinafter, the fact that pieces of hardware are coupled operably may include the fact that a direct or indirect connection between the pieces of hardware is established by wired or wirelessly such that second hardware is controlled by first hardware among the pieces of hardware. Although different blocks are shown, an example is not limited thereto.

Some of the pieces of hardware in FIG. 1 may be included in a single integrated circuit including a system on a chip (SoC). The type or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an example may include hardware for processing data based on one or more instructions. The hardware for processing data may include the processor 110.

For example, the hardware for processing data may include an arithmetic and logic unit (ALU), a floating point unit (FPU), a field programmable gate array (FPGA), a central processing unit (CPU), and/or an application processor (AP). The processor 110 may have a structure of a single-core processor, or may have a structure of a multi-core processor including a dual core, a quad core, a hexa core, or an octa core.

The LiDAR 120 included in the vehicle control apparatus 100 according to an example may obtain data sets from identifying objects surrounding the vehicle control apparatus 100. For example, the LiDAR 120 may identify at least one of a location of the surrounding object, a movement direction of the surrounding object, a speed of the surrounding object, or any combination thereof based on a pulse laser signal that is emitted from the LiDAR 120, reflected by the surrounding object, and returned.

The processor 110 included in the vehicle control apparatus 100 according to an example may obtain a virtual box of a first time point corresponding to an object, which is specified at the first time point, through the LiDAR 120. For example, the processor 110 may obtain the virtual box of the first time point by using a plurality of points, which are obtained at the first time point, through the LiDAR 120.

The processor 110 may convert the virtual box of the first time point into a virtual box of a second time point after the first time point to generate a tracking box.

For example, at least one of the first time point, the second time point, or any combination thereof may include a time point for obtaining a data set through the LiDAR 120. For example, the second time point may be referred to as a current time point (e.g., time point 't'). For example, the second time point may include a time point at which a current frame is obtained. For example, the first time point may include a time point immediately before the current frame is obtained. For example, the first time point may include time point 't−1'. It is expressed that a time point is at least one of the first time point, the second time point, or any combination thereof. However, at least one of the first time point, the second time point, or any combination thereof may mean a frame number. For example, when the second time point means a t-th frame, the first time point may mean a (t−1)-th frame.

In an example, the processor 110 may obtain a plurality of points of a second time point through the LiDAR 120. For example, the processor 110 may obtain virtual boxes of the second time point, which are formed by the plurality of points obtained at the second time point, through the LiDAR 120. For example, the virtual boxes of the second time point may be referred to as a "meta box". For example, the virtual boxes of the second time point may include boxes formed based on points obtained as light emitted from the LiDAR 120 is reflected from an external object.

In an example, the processor 110 may identify virtual boxes associated with a tracking box among the virtual boxes of the second time point based on obtaining virtual boxes of the second time point.

For example, the processor 110 may identify a ratio at which the tracking box overlaps each of the virtual boxes of the second time point. For example, the processor 110 may identify that the tracking box overlaps each of the virtual boxes obtained at the second time point at a specified ratio (e.g., about 25%) or more.

For example, the processor 110 may identify a distance between a plurality of first points included in the tracking box and a plurality of second points included in the virtual boxes of the second time point. For example, the processor 110 may determine whether a distance between the plurality of first points included in the tracking box and the plurality of second points included in the virtual boxes of the second time point is within a correlation distance. For example, the correlation distance may be referred to as "Mahalanobis distance".

In an example, the processor 110 may identify virtual boxes associated with the tracking box among the virtual boxes of the second time point based on the fact that the tracking box overlaps each of the virtual boxes obtained at the second time point by a specified ratio or more, or the distance between the plurality of first points included in the tracking box and the plurality of second points included in the virtual boxes of the second time point is identified as being within the correlation distance.

For example, the processor 110 may identify virtual boxes associated with the tracking box by identifying that the tracking box overlaps each of the virtual boxes obtained at the second time point by a specified ratio or more, or the distance between the plurality of first points included in the tracking box and the plurality of second points included in the virtual boxes of the second time point is within the correlation distance.

In an example, the processor 110 may merge all or part of the associated virtual boxes based on at least one of a distance between the virtual boxes of the second time point, whether at least one of the virtual boxes of the second time point corresponds to an object separated from a road edge, whether the virtual boxes of the second time point are included in the tracking box, or any combination thereof.

In an example, the processor 110 may identify whether a specified object is occluded. The processor 110 may identify that a specific object is not occluded.

In an example, the processor 110 may identify the type of the specified object. For example, the processor 110 may identify that the type of the specified object is a type different from the first specified type including a specialty vehicle.

In an example, the processor 110 may identify the number of virtual boxes of the second time point. For example, the processor 110 may identify the number of virtual boxes associated with the tracking box among the virtual boxes of the second time point. The processor 110 may identify that the number of virtual boxes, which are associated with the tracking box, among the virtual boxes of the second time point is smaller than the specified number (e.g., 3).

In an example, the processor 110 may identify the stationary state or moving state of the specified object based on the fact that the specified object is not occluded, the type of the specified object is identified as being different from the first specified type including a specialty vehicle, and the number of virtual boxes of the second time point is smaller than the specified number.

For example, the specialty vehicle may include at least one of a 1-ton truck, a container truck, a heavy truck, a trailer, or any combination thereof.

For example, the processor 110 may identify the stationary state or the moving state of the specified object based on the fact that the specified object is not occluded, the type of the specified object is identified as being different from the first specified type including a specialty vehicle, and the number of virtual boxes, which are associated with the tracking box, from among the virtual boxes of the second time point is smaller than the specified number.

In an example, the processor 110 may identify that the specified object is a stationary state among the stationary state and the moving state. The processor 110 may identify at least one of a width of the tracking box, a length of the tracking box, or any combination thereof based on identifying that the specified object is in a stationary state.

The processor 110 may identify that at least one of the width or length of the tracking box is greater than or equal to a first reference length (e.g., about 30 m), based on the specified object being in the stationary state.

The processor 110 may identify a first central point of a first virtual box among the virtual boxes of the second time point. The processor 110 may identify a first straight line perpendicular to a line segment forming the first virtual box from the first center point of the first virtual box among the virtual boxes of the second time point.

The processor 110 may identify a second central point of a second virtual box among the virtual boxes of the second time point.

In an example, the processor 110 may identify the first straight line perpendicular to a line segment forming the first virtual box from the first center point of the first virtual box among the virtual boxes of the second time point, based on the fact that the specified object is in the stationary state and at least one of the width or length of the tracking box is greater than or equal to the first reference length.

The processor 110 may identify a distance between the first straight line and a second center point of a second virtual box among the virtual boxes of the second time point. The processor 110 may not merge virtual boxes, which are associated with the tracking box, from among the virtual boxes of the second time point based on the fact that the distance between the first straight line and the second center point of the second virtual box among the virtual boxes of the second time point is greater than or equal to a second reference length (e.g., about 20 m).

In an example, the processor 110 may merge the associated virtual boxes based on the fact that the distance between the second center point of the second virtual box among the virtual boxes of the second time point and the first straight line is smaller than to the second reference length. The processor 110 may obtain a merge box based on merging the associated virtual boxes.

In an example, the processor 110 may identify the virtual box having an assigned first identifier indicating that the virtual box is closest to the host vehicle including the vehicle control apparatus 100 and has a width and length greater than or equal to a third reference length (e.g., about 1 m), from among the virtual boxes of the second time point. For example, the first identifier may be referred to as a "primary index".

For example, the processor 110 may identify a virtual box, which has an assigned second identifier indicating an object separated from a road edge, from among the virtual boxes of the second time point. For example, the second identifier may be referred to as "ContourSplitFlag".

In an embodiment, the processor 110 may not merge a virtual box, to which the first identifier is assigned, and a virtual box, to which the second identifier is assigned. For example, when the virtual box, to which the first identifier is assigned, and the virtual box, to which the second identifier is assigned, are attempted to be merged, the processor 110 may not merge the virtual box, to which the first identifier is assigned, and the virtual box, to which the second identifier is assigned. For example, the processor 110 may exclude the virtual box, to which the second identifier is assigned, from the merge candidate.

Hereinafter, an example of determining whether virtual boxes of the second time point are included in a tracking box based on at least one of the width, length, or any combination thereof of virtual boxes associated with the tracking box among the virtual boxes of the second time point will be described later.

In an embodiment, the processor 110 may identify at least one of the width, length, or any combination thereof of each of the associated virtual boxes.

For example, the processor 110 may obtain the sum of widths of the associated virtual boxes based on identifying widths of the associated virtual boxes.

For example, the processor 110 may obtain the sum of lengths of the associated virtual boxes based on identifying lengths of the associated virtual boxes.

The processor 110 may compare the sum of widths of the associated virtual boxes and the width of the tracking box. The processor 110 may compare the sum of lengths of the associated virtual boxes and the length of the tracking box.

For example, the processor 110 may compare the sum of the widths of the associated virtual boxes with the width of the tracking box, or may compare the sum of the lengths of the associated virtual boxes with the length of the tracking box.

In an embodiment, the processor 110 may identify that the sum of the widths of the associated virtual boxes exceeds the width of the tracking box. The processor 110 may not merge the associated virtual boxes based on the sum of the widths of the associated virtual boxes exceeding the width of the tracking box.

For example, the fact that the sum of the widths of the associated virtual boxes exceeds the width of the tracking box may include the fact that the associated virtual boxes are not included in the tracking box.

The processor 110 may identify that the sum of the widths of the associated virtual boxes is smaller than or equal to the width of the tracking box. The processor 110 may merge the associated virtual boxes based on the sum of the widths of the associated virtual boxes being smaller than or equal to the width of the tracking box.

In an embodiment, the processor 110 may identify that the sum of the lengths of the associated virtual boxes exceeds the length of the tracking box. The processor 110 may not merge the associated virtual boxes based on the sum of the lengths of the associated virtual boxes exceeding the length of the tracking box.

For example, the fact that the sum of the lengths of the associated virtual boxes exceeds the length of the tracking box may include the fact that the associated virtual boxes are not included in the tracking box.

The processor 110 may identify that the sum of the lengths of the associated virtual boxes is smaller than or equal to the length of the tracking box. The processor 110 may merge the associated virtual boxes based on the sum of the lengths of the associated virtual boxes being smaller than or equal to the length of the tracking box.

In an embodiment, the processor 110 may not merge the associated virtual boxes based on the sum of the widths of the associated virtual boxes exceeding the width of the tracking box, or the sum of the lengths of the associated virtual boxes exceeding the length of the tracking box.

The processor 110 may merge the associated virtual boxes based on the sum of the widths of the associated virtual boxes being smaller than or equal to the width of the tracking box, and the sum of the lengths of the associated virtual boxes being smaller than or equal to the length of the tracking box.

As described above, the processor 110 may merge all or part of the associated virtual boxes based on at least one of a distance between the virtual boxes of the second time point, whether at least one of the virtual boxes of the second time point corresponds to an object separated from a road edge, whether the virtual boxes of the second time point are included in the tracking box, or any combination thereof.

Hereinafter, an example of maintaining or canceling merging based on at least one of a size of a merge box generated by the merging, a difference between the size of the merge box and a size based on the associated virtual boxes, the type of a specified object, or any combination thereof will be described later.

In an embodiment, the processor 110 may merge all or part of the associated virtual boxes. The processor 110 may generate a merge box based on merging all or part of the associated virtual boxes.

In an embodiment, the processor 110 may identify the size of the merge box. The processor 110 may identify that the size of the merge box is greater than or equal to a first reference size (e.g., about 90 $m^2$).

In an embodiment, the processor 110 may identify at least one of a width of the merge box, a length of the merge box, or any combination thereof. The processor 110 may identify that one of the width and length of the merge box is greater than or equal to a fourth reference length (e.g., about 20 m).

In an embodiment, the processor 110 may cancel the merging based on the size of the merge box being greater than or equal to the first reference size, or one of the width and the length of the merge box being greater than or equal to the fourth reference length. For example, the processor 110 may separate the merge box into virtual boxes of the second time point based on the size of the merge box being greater than or equal to the first reference size, or one of the width and the length of the merge box being greater than or equal to the fourth reference length.

In an embodiment, the processor 110 may maintain the merging based on the size of the merge box being smaller than the first reference size, or the width or the length of the merge box being smaller than the fourth reference length.

The processor 110 may output the merge box based on the size of the merge box being smaller than the first reference size, or the width or the length of the merge box being smaller than the fourth reference length.

The processor 110 may map the merge box to an external object based on the size of the merge box being smaller than the first reference size, or the width or the length of the merge box being smaller than the fourth reference length. Hereinafter, an operation of outputting a merge box may include an operation of mapping the merge box to an external object.

In an embodiment, the processor 110 may identify virtual boxes associated with the tracking box among the second virtual boxes on a plane formed by the x-axis and the y-axis among the x-axis, the y-axis, and the z-axis. The processor 110 may identify a plurality of points included in the associated virtual boxes based on identifying associated virtual boxes on the plane formed by the x-axis and the y-axis.

The processor 110 may identify a minimum value on the x-axis, a maximum value on the x-axis, a minimum value on the y-axis, and a maximum value on the y-axis among the plurality of points included in the associated virtual boxes.

The processor 110 may obtain a quadrangle based on the minimum value on the x-axis, the maximum value on the x-axis, the minimum value on the y-axis, and the maximum value on the y-axis. The processor 110 may obtain the quadrangle including the minimum value on the x-axis, the maximum value on the x-axis, the minimum value on the y-axis, and the maximum value on the y-axis.

For example, the processor 110 may identify a first line segment that is parallel to the y-axis and includes the minimum value on the x-axis. The processor 110 may identify a second line segment that is parallel to the y-axis and includes the maximum value on the x-axis. The processor 110 may identify a third line segment that is parallel to the x-axis and includes the minimum value on the y-axis. The processor 110 may identify a fourth line segment that is parallel to the x-axis and includes the maximum value on the y-axis.

The processor 110 may obtain the quadrangle based on the first line segment, the second line segment, the third line segment, and the fourth line segment.

In an embodiment, the processor 110 may identify a size of the quadrangle formed by the minimum value on the x-axis, the maximum value on the x-axis, the minimum value on the y-axis, and the maximum value on the y-axis. The processor 110 may identify a difference between a size of a merge box and a size of the quadrangle formed by the minimum value on the x-axis, the maximum value on the x-axis, the minimum value on the y-axis, and the maximum value on the y-axis.

The processor 110 may identify that the difference between the size of the merge box and the size of the quadrangle formed by the minimum value on the x-axis, the maximum value on the x-axis, the minimum value on the y-axis, and the maximum value on the y-axis is greater than or equal to a second reference size (e.g., about 2 $m^2$).

The processor 110 may unmerge the merge box based on the fact that the difference between the size of the merge box and the size of the quadrangle formed by the minimum value on the x-axis, the maximum value on the x-axis, the minimum value on the y-axis, and the maximum value on the y-axis is greater than or equal to the second reference size (e.g., about 2 $m^2$).

In an embodiment, the processor 110 may identify that a specified object is a moving state among a stationary state and the moving state. The processor 110 may identify that the merge box is located in a region in which a specified distance from a boundary of field of view (FOV) of the LiDAR 120 is exceeded.

In an embodiment, the processor 110 may identify that the specified object is in the moving state among the stationary state and the moving state, and the merge box is located in a region in which a specified distance from the boundary of the FOV of the LiDAR 120 is exceeded.

In an embodiment, the processor 110 may identify the type of the specified object. The processor 110 may identify at least one of the width of the merge box, the length of the merge box, or any combination thereof.

In an embodiment, when the type of the specified object is a first specified type including a specialty vehicle, the processor 110 may identify that the width of the merge box is greater than or equal to a fifth reference length (e.g., about 4.5 m), or the length of the merge box is greater than or equal to a sixth reference length (e.g., about 20 m). When the type of the specified object is the first specified type including the specialty vehicle, the processor 110 may cancel the merging based on the width of the merge box being greater than or equal to the fifth reference length, or the length of the merge box being greater than or equal to the sixth reference length.

In an embodiment, when the type of the specified object is the first specified type including the specialty vehicle, the processor 110 may maintain the merging based on the width of the merge box being smaller than the fifth reference length, and the length of the merge box being smaller than the sixth reference length. When the type of the specified object is the first specified type including the specialty vehicle, the processor 110 may output the merge box based on the width of the merge box being smaller than the fifth reference length, and the length of the merge box being smaller than the sixth reference length.

In an embodiment, when the type of the specified object is a second specified type including a passenger vehicle, the processor 110 may identify that the width of the merge box is greater than or equal to the fifth reference length (e.g., about 4.5 m), and the length of the merge box is greater than or equal to the sixth reference length (e.g., about 20 m). When the type of the specified object is the second specified type including the passenger vehicle, the processor 110 may cancel the merging based on the width of the merge box being greater than or equal to the fifth reference length, and the length of the merge box being greater than or equal to the sixth reference length.

In an embodiment, when the type of the specified object is the second specified type including the passenger vehicle, the processor 110 may maintain the merging based on the width of the merge box being smaller than the fifth reference length, and the length of the merge box being smaller than the sixth reference length. When the type of the specified object is the second specified type including the passenger vehicle, the processor 110 may output the merge box based on the width of the merge box being smaller than the fifth reference length, and the length of the merge box being smaller than the sixth reference length.

In an embodiment, the processor 110 may identify that the type of the specified object is a third specified type including a pedestrian. When the type of the specified object is the third specified type including a pedestrian, the processor 110 may identify that the width or length of the merge box is greater than or equal to a seventh reference length (e.g., approximately 1.5 m). When the type of the specified object is the third specified type including a pedestrian, the processor 110 may cancel the merging based on the width or length of the merge box being greater than or equal to the seventh reference length.

In an embodiment, when the type of the specified object is the third type including a pedestrian, the processor 110 may maintain the merging based on the width and length of the merge box being smaller than the seventh reference length. For example, when the type of the specified object is the third specified type including a pedestrian, the processor 110 may output the merge box based on the width and length of the merge box being smaller than the seventh reference length.

In an embodiment, when the type of the specified object is not identified, the processor 110 may identify that the width or length of the merge box is greater than or equal to the sixth reference length. When the type of the specified object is not identified, the processor 110 may cancel the merging based on the width or length of the merge box being greater than or equal to the sixth reference length.

In an embodiment, when the type of the specified object is not identified, the processor 110 may identify that the width and length of the merge box is smaller than the sixth reference length. When the type of the specified object is not identified, the processor 110 may cancel the merging based on the width and length of the merge box being smaller than the sixth reference length. When the type of the specified object is not identified, the processor 110 may output the merge box based on the width and length of the merge box being smaller than the sixth reference length.

As mentioned above, the processor 110 included in the vehicle control apparatus 100 according to an embodiment may determine whether to merge virtual boxes associated with the tracking box among the second virtual boxes. The processor 110 may obtain a merge box based on merging all or part of the associated virtual boxes, and then may determine the appropriateness of the obtained merge box.

FIG. 2 shows an example of generating a merge box by using virtual boxes, in an embodiment of the present disclosure.

Operations of FIG. 2 may be performed by the vehicle control apparatus 100 of FIG. 1. For example, an operations of FIG. 2 may be performed by the processor 110 included in the vehicle control apparatus 100 of FIG. 1.

Referring to a first example 201 in FIG. 2, a processor included in a vehicle control apparatus according to an embodiment may obtain a virtual box 211 of a first time point corresponding to a specified object at the first time point through a LiDAR. For example, the processor may obtain the virtual box 211 by using a plurality of points obtained at time point 't−1'.

Referring to a second example 203 in FIG. 2, in an embodiment, the processor may convert the virtual box 211 of the first time point into a virtual box of a second time point after the first time point to generate a tracking box 213. For example, the second time point may be referred to as a current frame.

Referring to a third example 205 in FIG. 2, in an embodiment, the processor may obtain virtual boxes 221, 223, 225, and 227 of the second time point, which are formed by a plurality of points obtained at the second time point, through the LiDAR.

The processor may identify virtual boxes associated with the tracking box 213 among the virtual boxes 221, 223, 225, and 227 of the second time point based on obtaining the virtual boxes 221, 223, 225, and 227 of the second time point formed by the plurality of points obtained at the second time point.

For example, the processor may determine whether the tracking box 213 is associated with the virtual boxes 221, 223, 225, and 227 of the second time point, based on at least one of a tracking point, an output point, a center point, a ratio at which the tracking box 213 overlaps the virtual boxes 221, 223, 225, and 227 of the second time point, or any combination thereof.

For example, the processor may determine whether the tracking box 213 is associated with the virtual boxes 221, 223, 225, and 227 of the second time point, based on a correlation distance between the tracking box 213 and the virtual boxes 221, 223, 225, and 227 of the second time point.

For example, the processor may determine whether the tracking box 213 is associated with the virtual boxes 221, 223, 225, and 227 of the second time point, based on the correlation distance obtained based on Mahalanobis distance. For example, when the Mahalanobis distance is smaller than or equal to a reference distance (e.g., about 0.5 m), the processor may determine that the tracking box 213 is associated with the virtual boxes 221, 223, 225, and 227 of the second time point.

For example, the processor may determine that the tracking box 213 is associated with the virtual boxes 221, 223, 225, and 227 of the second time point, based on the fact that the tracking box 213 overlaps the virtual boxes 221, 223, 225, and 227 of the second time point by a reference ratio (e.g., approximately 25%) or more.

Referring to a fourth example 207 in FIG. 2, in an embodiment, the processor may generate a merge box 230 based on the associated virtual boxes 221, 223, 225, and 227.

For example, the processor may merge the virtual boxes 221, 223, 225, and 227 associated with the tracking box 213. For example, the processor may merge all or part of the virtual boxes 221, 223, 225, and 227 associated with the tracking box 213.

The processor may generate the merge box 230 based on merging all or part of the associated virtual boxes 221, 223, 225, and 227.

Hereinafter, embodiments of the vehicle control apparatus for generating the merge box 230 will be described later.

Figure 3:
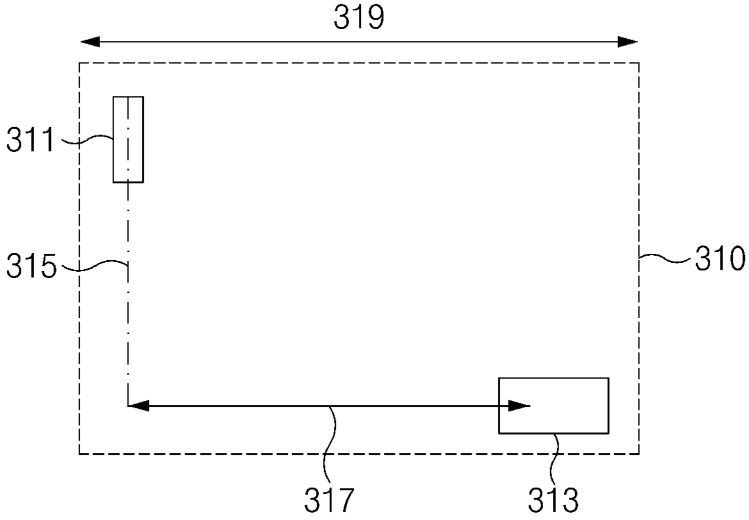
FIG. 3 shows an example of identifying a distance between virtual boxes, in an example of the present disclosure.

FIG. 3 shows an example of identifying a distance between virtual boxes, in an embodiment of the present disclosure.

Operations of FIG. 3 may be performed by the vehicle control apparatus 100 of FIG. 1. For example, operations of FIG. 3 may be performed by the processor 110 included in the vehicle control apparatus 100 of FIG. 1.

Each of a first example 301 and a second example 303 in FIG. 3 show an example of merging all or part of virtual boxes associated with a tracking box based on a distance between the virtual boxes of a second time point.

Referring to the first example 301, a processor included in a vehicle control apparatus according to an embodiment may identify virtual boxes 311 and 313 associated with a tracking box 310 among virtual boxes of the second time point. For example, when a specified object corresponding to the tracking box 310 is identified as being in a stationary state, the processor may perform operations described in the first example 301.

In an embodiment, the processor 110 may determine whether the specified object is in a stationary state or a moving state, based on at least one of whether the specified object corresponding to the tracking box 310 is occluded, the type of the specified object, the number of virtual boxes of the second time point, or any combination thereof.

The processor may identify the stationary state or the moving state of the specified object based on the fact that the specified object is not occluded, the type of the specified object is identified as being different from the first specified type including a specialty vehicle, and the number of virtual boxes of the second time point is smaller than the specified number (e.g., about 3).

The processor may identify that the specified object is in the stationary state, and may identify that at least one of a width 319 of the tracking box 310, a length of the tracking box 310, or any combination thereof is greater than or equal to a first reference length (e.g., about 30 m).

For example, when the specified object corresponding to the tracking box 310 is in the stationary state, the width 319 of the tracking box 310 is greater than or equal to 30 m, and a distance between associated virtual boxes is greater than or equal to 20 m, the processor may not merge the associated virtual boxes.

For example, the processor may identify a first straight line 315 that is perpendicular to a line segment forming the first virtual box 311 from the center point of the first virtual box 311, based on the fact that the first virtual box 311 is associated with the second virtual box 313.

The processor may identify a distance 317 between the first straight line 315 and the center point of the second virtual box 313. The processor may not merge the first virtual box 311 and the second virtual box 313 based on identifying that the distance between the first straight line 315 and the center point of the second virtual box 313 is greater than or equal to a reference distance (e.g., about 20 m).

The operation in which the processor does not merge the first virtual box 311 and the second virtual box 313 may include an operation in which the processor excludes at least one of the first virtual box 311, the second virtual box 313, or any combination thereof from merge candidates.

Referring to the second example 303, in an embodiment, the processor may identify that a specified object is not occluded, the type of the specified object is identified as being of a first specified type including a pedestrian, the number of virtual boxes of the second time point is smaller than the specified number (e.g., 3), and the specified object is in a moving state.

The processor may identify virtual boxes 321 and 323 associated with a tracking box 320. For example, the processor may identify the first virtual box 321 associated with the tracking box 320, and the second virtual box 323 associated with the tracking box 320.

For example, the processor may identify the width and length of the first virtual box 321. The processor may identify the width and length of the second virtual box 323.

The processor may identify that each of the width and length of the first virtual box 321 is smaller than or equal to about 1 m. The processor may identify that each of the width and length of the second virtual box 323 is smaller than or equal to about 1 m.

The processor may identify the distance between the first virtual box 321 and the second virtual box 323 based on the fact that each of the width and length of the first virtual box 321 and the second virtual box 323 is smaller than or equal to about 1 m.

For example, the processor may identify the first center point of the first virtual box 321 and the second center point of the second virtual box 323. For example, at least one of the first center point of the first virtual box 321, the second center point of the second virtual box 323, or any combination thereof may be obtained based on a coordinate system that is centered on a host vehicle and uses a location of the host vehicle including a vehicle control apparatus as an origin point.

The processor may identify a distance 325 between the first center point of the first virtual box 321 and the second center point of the second virtual box based on identifying the first center point of the first virtual box 321 and the second center point of the second virtual box.

The processor may not merge the first virtual box 321 and the second virtual box 323 based on identifying that the distance 325 between the first center point of the first virtual box 321 and the second center point of the second virtual box 323 is greater than or equal to about 1.5 m.

The operation in which the processor does not merge the first virtual box 321 and the second virtual box 323 may include an operation in which the processor excludes at least one of the first virtual box 321, the second virtual box 323, or any combination thereof from a merge candidate.

Figure 4:
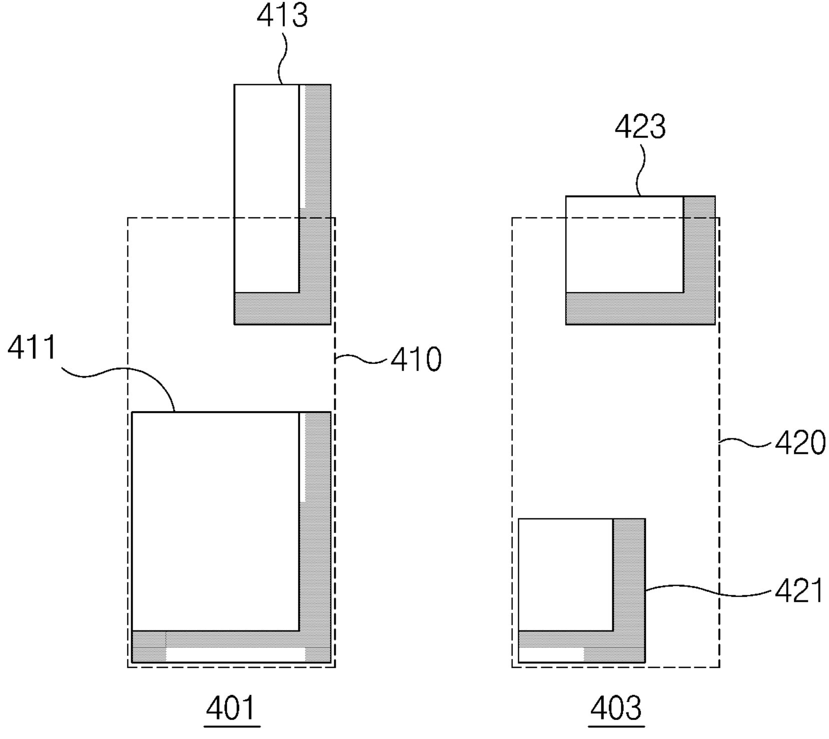
FIG. 4 shows an example of comparing a width or a length of a virtual box with a width or a length of a tracking box, in an example of the present disclosure.

FIG. 4 shows an example of comparing a width or a length of a virtual box with a width or a length of a tracking box, in an embodiment of the present disclosure.

Operations of FIG. 4 may be performed by the vehicle control apparatus 100 of FIG. 1. For example, an operations of FIG. 4 may be performed by the processor 110 included in the vehicle control apparatus 100 of FIG. 1.

Referring to FIG. 4, in a first example 401, a processor included in a vehicle control apparatus according to an embodiment may identify virtual boxes 411 and 413 associated with a tracking box 410 among virtual boxes of the second time point.

In an embodiment, the processor may identify the array of points included in each of the associated virtual boxes 411 and 413. For example, the processor may identify that the array of points included in each of the associated virtual boxes 411 and 413 has a specified shape. For example, the specified shape may include an L-shape among the L-shape and an I-shape.

In an embodiment, the processor may obtain at least one of a width, a length, or any combination thereof of each of the associated virtual boxes 411 and 413, based on the array of points in each of the associated virtual boxes 411 and 413 having a specified shape.

In an embodiment, the processor may obtain at least one of a first width, a first length, or any combination thereof of the first virtual box 411 among the associated virtual boxes 411 and 413. The processor may obtain at least one of a second width, a second length, or any combination thereof of the second virtual box 413 among the associated virtual boxes 411 and 413.

The processor may obtain the sum of the first width of the first virtual box 411 and the second width of the second virtual box 413. The processor may obtain the sum of the first length of the first virtual box 411 and the second length of the second virtual box 413.

The processor may compare the sum of the first width and the second width with the width of the tracking box 410. The processor may compare the sum of the first length and the second length with the length of the tracking box 410.

The processor may not merge the associated virtual boxes 411 and 413 based on the sum of the first width and the second width exceeding the width of the tracking box 410, or the sum of the first length and the second length exceeding the length of the tracking box 410. The first example 401 may include an example in which the sum of the first length and the second length exceeds the length of the tracking box 410.

In a second example 403, a processor included in a vehicle control apparatus according to an embodiment may identify virtual boxes 421 and 423 associated with a tracking box 420 among virtual boxes of the second time point.

In an embodiment, the processor may identify the array of points included in each of the associated virtual boxes 421 and 423. For example, the processor may identify that the array of points included in each of the associated virtual boxes 421 and 423 has a specified shape. For example, the specified shape may include an L-shape among the L-shape and an I-shape.

In an embodiment, the processor may obtain at least one of a width, a length, or any combination thereof of each of the associated virtual boxes 421 and 423, based on the array of points included in each of the associated virtual boxes 421 and 423 having a specified shape.

In an embodiment, the processor may obtain at least one of a third width, a third length, or any combination thereof of the third virtual box 421 among the associated virtual boxes 421 and 423. The processor may obtain at least one of a fourth width, a fourth length, or any combination thereof of the fourth virtual box 423 among the associated virtual boxes 421 and 423.

The processor may obtain the sum of the third width of the third virtual box 421 and the fourth width of the fourth virtual box 423. The processor may obtain the sum of the third length of the third virtual box 421 and the fourth length of the fourth virtual box 423.

The processor may compare the sum of the third width and the fourth width with the width of the tracking box 420. The processor may compare the sum of the third length and the fourth length with the length of the tracking box 420.

The processor may not merge the associated virtual boxes 421 and 423 based on the sum of the third width and the fourth width exceeding the width of the tracking box 420, or the sum of the third length and the fourth length exceeding the length of the tracking box 420. The second example 403 may include an example in which the sum of the third width and the fourth width exceeds the width of the tracking box 420.

Figure 5:
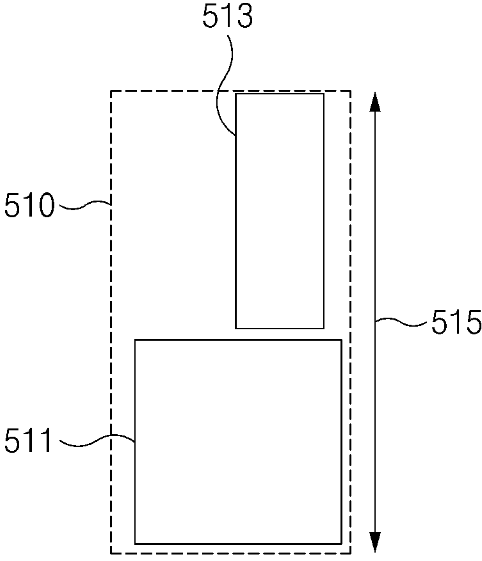
FIG. 5 shows an example of comparing a size of virtual boxes and a size of a merge box, in an example of the present disclosure.

FIG. 5 shows an example of comparing a size of virtual boxes and a size of a merge box, in an embodiment of the present disclosure.

Operations of FIG. 5 may be performed by the vehicle control apparatus 100 of FIG. 1. For example, an operations of FIG. 5 may be performed by the processor 110 included in the vehicle control apparatus 100 of FIG. 1.

Referring to FIG. 5, a processor included in a vehicle control apparatus according to an embodiment may generate a merge box 510 based on associated virtual boxes 511 and 513.

In an embodiment, the processor may identify a size of the merge box 510. For example, the processor may identify the width and the length of the merge box 510. The processor may identify the size of the merge box 510 based on identifying the width and the length of the merge box 510.

For example, the processor may identify the merge box 510 on a plane formed by an x-axis and a y-axis, among the x-axis, the y-axis, and a z-axis. The processor may identify the size of the merge box 510 on the plane formed by the x-axis and the y-axis.

For example, the processor may identify the coordinates of each of vertices included in the merge box 510 on the plane formed by the x-axis and the y-axis. The processor may identify line segments forming the merge box 510 based on the coordinates of each of the vertices included in the merge box 510.

The processor may identify the length of each of line segments forming the merge box 510. For example, each of line segments, which correspond to the y-axis direction, among the line segments forming the merge box 510 may be referred to as a "width". For example, each of line segments, which correspond to the x-axis direction, among the line segments forming the merge box 510 may be referred to as a "length".

In an embodiment, the processor may determine whether the length 515 of the merge box 510 exceeds a reference length (e.g., about 20 m). The processor may cancel the merging based on the length 515 of the merge box 510 exceeding the reference length. For example, the processor may separate the merge box 510 into virtual boxes 511 and 513 based on the length of the merge box 510 exceeding the reference length.

In an embodiment, the processor may maintain the merging based on the length of the merge box 510 being smaller than or equal to the reference length. For example, the processor may output the merge box 510 based on the length 515 of the merge box 510 being smaller than or equal to the reference length.

The processor may identify the width and length of the merge box 510 based on the coordinates included in the merge box 510 on the plane formed by the x-axis and the y-axis. The processor may identify the size of the merge box 510 based on the identified width and the identified length of the merge box 510.

In an embodiment, on the basis of identifying the size of the merge box 510, the processor may maintain or cancel the merging of the merge box 510.

For example, the processor may determine whether the size of the merge box 510 exceeds a reference size (e.g., 90 $m^2$).

For example, the processor may cancel the merging of the merge box 510 based on the size of the merge box 510 exceeding the reference size.

For example, the processor may maintain the merging of the merge box 510 based on the size of the merge box 510 being smaller than or equal to the reference size. When the merge box 510 is maintained, the processor may output the merge box 510.

Figure 6:
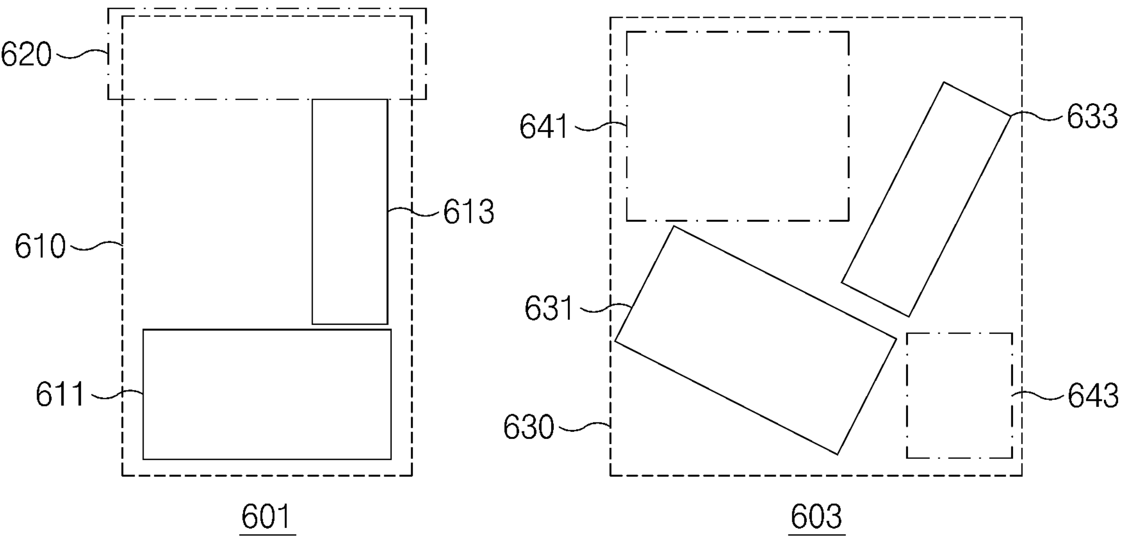
FIG. 6 shows an example of comparing a size of virtual boxes and a size of a merge box, in an example of the present disclosure.

FIG. 6 shows an example of comparing a size of virtual boxes and a size of a merge box, in an embodiment of the present disclosure.

Operations of FIG. 6 may be performed by the vehicle control apparatus 100 of FIG. 1. For example, an operations of FIG. 6 may be performed by the processor 110 included in the vehicle control apparatus 100 of FIG. 1.

Referring to FIG. 6, a processor included in a vehicle control apparatus according to an embodiment may compare sizes of merge boxes 610 and 630 with sizes of virtual boxes 611, 613, 631, and 633. For example, the processor may generate a quadrangle based on points that form the virtual boxes 611, 613, 631, and 633. The processor may identify the size of the generated quadrangle and the size of the merge box 610 or 630. The processor may maintain the merging of the merge box 610 or 630 or may unmerge the merge box 610 or 630 based on a size difference between the size of the generated quadrangle and the merge box 610 or 630.

Referring to a first example 601 in FIG. 6, in an embodiment, the processor may generate the merge box 610 based on the virtual boxes 611 and 613 associated with a tracking box. The processor may identify the size of the merge box 610 based on generating the merge box 610.

The processor may identify vertices of the virtual boxes 611 and 613. The processor may identify at least one of a minimum value on the x-axis, a maximum value on the x-axis, a minimum value on the y-axis, a maximum value on the y-axis, or any combination thereof among the vertices of the virtual boxes 611 and 613.

In detail, the processor may identify a plurality of points included in the associated virtual boxes 611 and 613 identified on the plane formed by the x-axis and the y-axis among the x-axis, the y-axis, and the z-axis. The processor may identify the minimum value on the x-axis, the maximum value on the x-axis, the minimum value on the y-axis, and the maximum value on the y-axis among a plurality of points included in the associated virtual boxes 611 and 613 identified on the plane formed by the x-axis and the y-axis among the x-axis, the y-axis, and a z-axis.

The processor may form a quadrangle based on the minimum value on the x-axis, the maximum value on the x-axis, the minimum value on the y-axis, and the maximum value on the y-axis. The processor may identify a size of the quadrangle formed by the minimum value on the x-axis, the maximum value on the x-axis, the minimum value on the y-axis, and the maximum value on the y-axis.

The processor may identify that the difference between the size of the merge box 610 and the size of the quadrangle formed by the minimum value on the x-axis, the maximum value on the x-axis, the minimum value on the y-axis, and the maximum value on the y-axis is greater than or equal to a reference size (e.g., 2 $m^2$).

The processor may unmerge the merge box 610 based on the fact that the difference between the size of the merge box 610 and the size of the quadrangle formed by the minimum value on the x-axis, the maximum value on the x-axis, the minimum value on the y-axis, and the maximum value on the y-axis is greater than or equal to the reference size.

The processor may maintain the merging of the merge box 610 based on the fact that a difference 620 between the size of the merge box 610 and the size of the quadrangle formed by the minimum value on the x-axis, the maximum value on the x-axis, the minimum value on the y-axis, and the maximum value on the y-axis is smaller than the reference size. The processor may maintain the merging of the merge box 610 based on the fact that the difference 620 between the size of the merge box 610 and the size of the quadrangle formed by the minimum value on the x-axis, the maximum value on the x-axis, the minimum value on the y-axis, and the maximum value on the y-axis is smaller than the reference size, and may output the merge box 610.

Referring to a second example 603 in FIG. 6, in an embodiment, the processor may identify that virtual boxes 631 and 633 associated with the tracking box are not parallel to at least one of the x-axis, the y-axis, or any combination thereof. While the virtual boxes 631 and 633 associated with the tracking box are not parallel to at least one of the x-axis, the y-axis, or any combination thereof, the processor may identify differences 641 and 643 between the size of the merge box 630 and sizes of the virtual boxes 631 and 633.

For example, the processor may identify a plurality of points included in the associated virtual boxes 631 and 633 identified on the plane formed by the x-axis and the y-axis among the x-axis, the y-axis, and the z-axis. The processor may identify the minimum value on the x-axis, the maximum value on the x-axis, the minimum value on the y-axis, and the maximum value on the y-axis among a plurality of points included in the associated virtual boxes 631 and 633 identified on the plane formed by the x-axis and the y-axis among the x-axis, the y-axis, and a z-axis.

The processor may form a quadrangle based on the minimum value on the x-axis, the maximum value on the x-axis, the minimum value on the y-axis, and the maximum value on the y-axis. The processor may identify a size of the quadrangle formed by the minimum value on the x-axis, the maximum value on the x-axis, the minimum value on the y-axis, and the maximum value on the y-axis.

The processor may identify that the difference between the size of the merge box 630 and the size of the quadrangle formed by the minimum value on the x-axis, the maximum value on the x-axis, the minimum value on the y-axis, and the maximum value on the y-axis is greater than or equal to a reference size (e.g., 2 $m^2$).

The processor may unmerge the merge box 630 based on the fact that the difference between the size of the merge box 630 and the size of the quadrangle formed by the minimum value on the x-axis, the maximum value on the x-axis, the minimum value on the y-axis, and the maximum value on the y-axis is greater than or equal to the reference size.

The processor may maintain the merging of the merge box 630 based on the fact that a difference 641 or 643 between the size of the merge box 630 and the size of the quadrangle formed by the minimum value on the x-axis, the maximum value on the x-axis, the minimum value on the y-axis, and the maximum value on the y-axis is smaller than the reference size. The processor may maintain the merging of the merge box 630 based on the fact that the difference 641 or 643 between the size of the merge box 630 and the size of the quadrangle formed by the minimum value on the x-axis, the maximum value on the x-axis, the minimum value on the y-axis, and the maximum value on the y-axis is smaller than the reference size, and may output the merge box 630.

Figure 7:
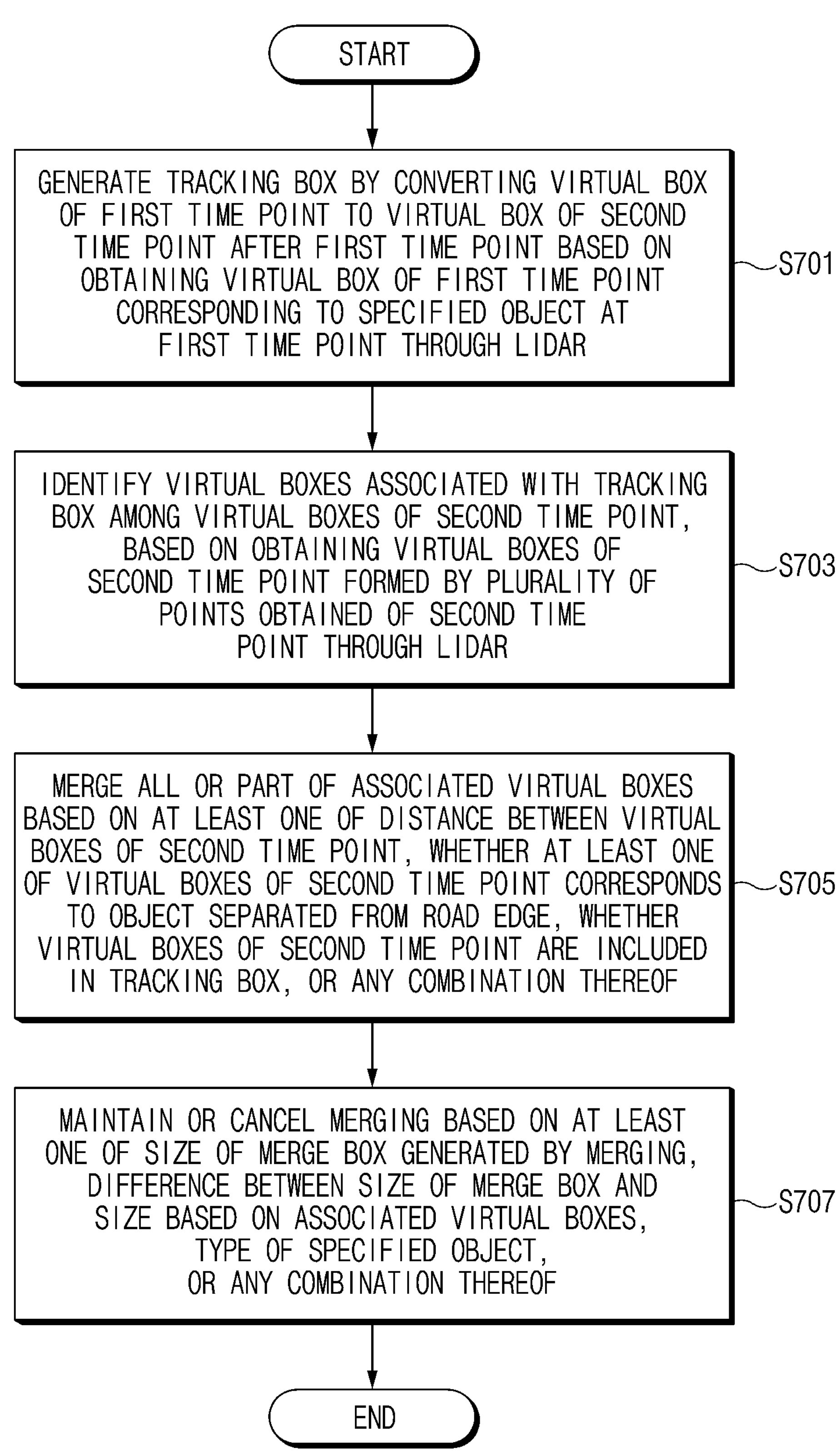
FIG. 7 shows an example of a flowchart of a vehicle control method, according to another example of the present disclosure.

FIG. 7 shows an example of a flowchart of a vehicle control method, according to another embodiment of the present disclosure.

Hereinafter, it is assumed that the vehicle controlling apparatus 100 of FIG. 1 performs the process of FIG. 7. In addition, in a description of FIG. 7, it may be understood that an operation described as being performed by an apparatus is controlled by the processor 110 of the vehicle control apparatus 100.

Referring to FIG. 7, in operation S701, a vehicle control method according to an embodiment may include an operation of generating a tracking box by converting a virtual box of a first time point to a virtual box of a second time point after the first time point based on obtaining the virtual box of the first time point corresponding to a specified object at the first time point through a LiDAR.

In operation S703, the vehicle control method according to an embodiment may include an operation of identifying virtual boxes associated with the tracking box among virtual boxes of the second time point, based on obtaining the virtual boxes of the second time point formed by a plurality of points obtained at the second time point through the LiDAR;

For example, the vehicle control method may identify the virtual boxes associated with the tracking box among the virtual boxes of the second time point based on at least one of an area where the tracking box overlaps each of the virtual boxes of the second time point, a correlation distance between points included in each of the virtual boxes of the second time point and points included in the tracking box, or any combination thereof.

In operation S705, the vehicle control method according to an embodiment may include an operation of merging all or part of the associated virtual boxes based on at least one of a distance between the virtual boxes of the second time point, whether at least one of the virtual boxes of the second time point corresponds to an object separated from a road edge, or any combination thereof.

In operation S707, the vehicle control method according to an embodiment may include an operation of maintaining or canceling the merging based on at least one of a size of a merge box generated by the merging, a difference between the size of the merge box and a size based on the associated virtual boxes, a type of the specified object, or any combination thereof.

Figure 8:
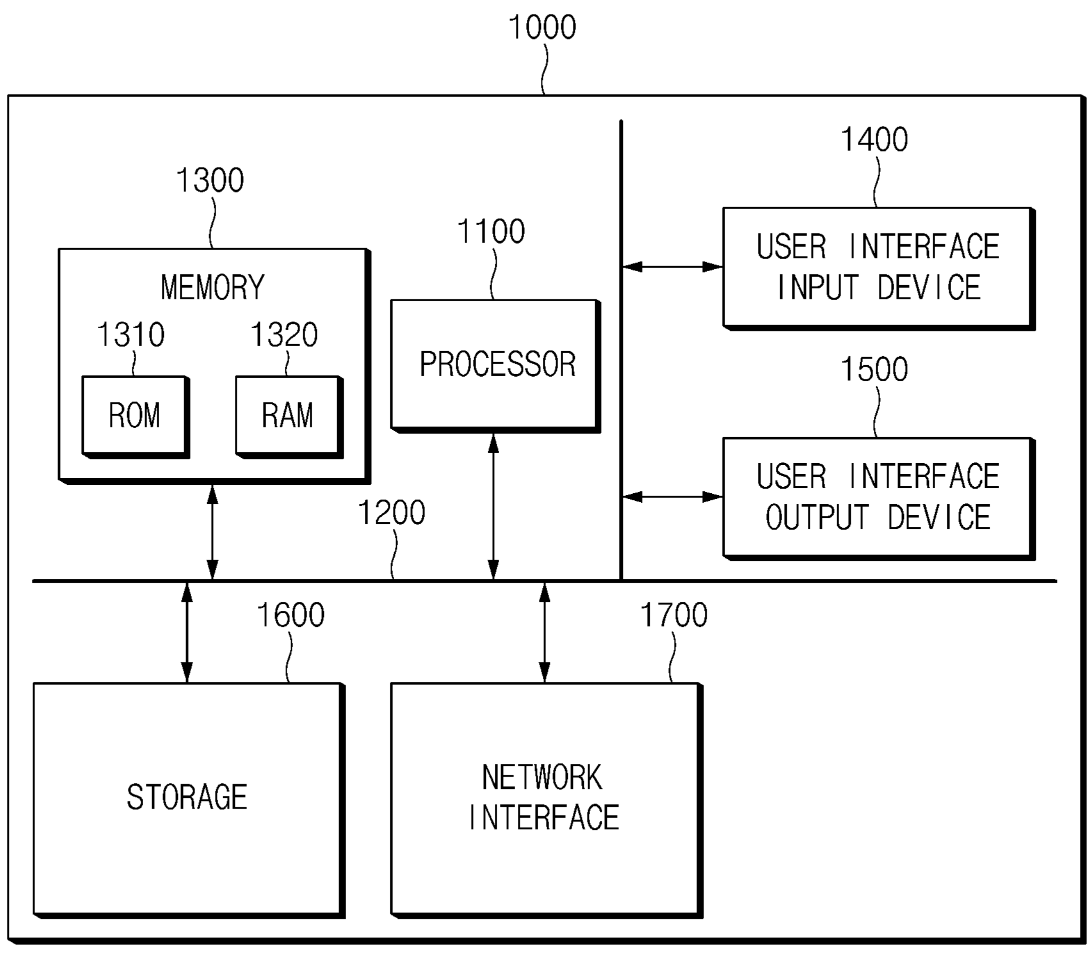
FIG. 8 shows an example of a computing system associated with a vehicle control apparatus, according to an example of the present disclosure.

FIG. 8 shows a computing system associated with a vehicle control apparatus, according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The present disclosure has been made to solve the above-mentioned problems occurring in the prior art while advantages achieved by the prior art are maintained intact.

An example of the present disclosure provides a vehicle control apparatus that merges virtual boxes generated by using a sensor (e.g., LiDAR) or cancels or unmerges the merge box, and a method thereof.

An example of the present disclosure provides a vehicle control apparatus that reduces a load of a processor by determining whether to merge virtual boxes before merging the virtual boxes, and a method thereof.

An example of the present disclosure provides a vehicle control apparatus that determines whether to merge virtual boxes by using sizes of virtual boxes and a size of a tracking box, or determines whether to cancel the merging by using the sizes of virtual boxes and a size of a merge box and outputs the merge box to output a correct merge box, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include a light detection and ranging (LiDAR) and a processor. The processor may generate a tracking box by converting a virtual box of a first time point to a virtual box of a second time point after the first time point based on obtaining the virtual box of the first time point corresponding to a specified object at the first time point through the LiDAR, may identify or determine virtual boxes associated with the tracking box among virtual boxes of the second time point, based on obtaining the virtual boxes of the second time point formed by a plurality of points obtained at the second time point through the LiDAR, may merge all or part of the associated virtual boxes based on at least one of a distance between the virtual boxes of the second time point, whether at least one of the virtual boxes of the second time point corresponds to an object separated from a road edge (e.g., a border line, a guard rail, a fence, or a road wall, etc.), whether the virtual boxes of the second time point are included in the tracking box, or a combination of the distance between the virtual boxes of the second time point, whether at least one of the virtual boxes of the second time point corresponds to the object separated from the road edge, and whether the virtual boxes of the second time point are included in the tracking box, and may maintain or cancel the merging based on at least one of a size of a merge box generated by the merging, a difference between the size of the merge box and a size based on the associated virtual boxes, a type of the specified object, or a combination of the size of the merge box, the difference between the size of the merge box and the size based on the associated virtual boxes, and the type of the specified object.

In an example, the processor may identify or determine the virtual boxes associated with the tracking box among the virtual boxes of the second time point based on a fact that the tracking box overlaps each of the virtual boxes of the second time point by a specified ratio or more, or a distance between a plurality of first points included in the tracking box and a plurality of second points included in the virtual boxes of the second time point is identified as being within a correlation distance.

In an example, the processor may identify or determine a stationary or a moving state of the specified object based on a fact that the specified object is not occluded, the type of the specified object is identified as a type different from a first specified type including a specialty vehicle, and the number of the virtual boxes of the second time point is smaller than a specified number.

In an example, the processor may identify or determine that the specified object is in the stationary state, may identify or determine that at least one of a width or a length of the tracking box is greater than or equal to a first reference length, may identify or determine a first straight line perpendicular to a line segment forming a first virtual box from a first center point of the first virtual box among the virtual boxes of the second time point, based on a fact that the specified object is in the stationary state and at least one of the width or the length of the tracking box is greater than or equal to the first reference length, and may not merge the associated virtual boxes based on a fact that a distance between the first straight line and a second center point of a second virtual box among the virtual boxes of the second time point is greater than or equal to a second reference length.

In an example, the processor may identify or determine a virtual box having a first identifier indicating that the virtual box is closest to a host vehicle including the vehicle control apparatus and has a width and a length, each of which is greater than or equal to a third reference length, from among the virtual boxes of the second time point, may identify or determine a virtual box, which has a second identifier indicating an object separated from the road edge, from among the virtual boxes of the second time point, and may not merge the virtual box having the first identifier, and the virtual box having the second identifier.

In an example, the processor may identify or determine a virtual box, which does not overlap the tracking box, from among the virtual boxes of the second time point, and may merge part of the associated virtual boxes, other than the virtual box thus not overlapped.

In an example, the processor may identify or determine at least one of a width of each of the associated virtual boxes, a length of each of the associated virtual boxes, or a combination of the width of each of the associated virtual boxes and the length of each of the associated virtual boxes, may compare a sum of widths of the associated virtual boxes with a width of the tracking box, or may compare a sum of lengths of the associated virtual boxes with a length of the tracking box, and may not merge the associated virtual boxes based on the sum of the widths of the associated virtual boxes exceeding the width of the tracking box, or the sum of the lengths of the associated virtual boxes exceeding the length of the tracking box.

In an example, the processor may cancel the merging based on the size of the merge box being greater than or equal to a first reference size, or one of a width and a length of the merge box being greater than or equal to a fourth reference length.

In an example, the processor may identify or determine a minimum value on an x-axis, a maximum value on the x-axis, a minimum value on a y-axis, and a maximum value on the y-axis among a plurality of points included in the associated virtual boxes identified on a plane formed by the x-axis and the y-axis among the x-axis, the y-axis, and a z-axis, and may cancel the merging based on a fact that a difference between the size of the merge box and a size of a quadrangle formed by the minimum value on the x-axis, the maximum value on the x-axis, the minimum value on the y-axis, and the maximum value on the y-axis is greater than or equal to a second reference size.

In an example, the processor may identify that the specified object is in a moving state among a stationary state and the moving state, and the merge box is located in a region in which a specified distance from a boundary of field of view (FOV) of the LiDAR is exceeded, may cancel the merging based on the width of the merge box being greater than or equal to a fifth reference length, or the length of the merge box being greater than or equal to a sixth reference length if the type of the specified object is a first specified type including a specialty vehicle, may cancel the merging based on the width of the merge box being greater than or equal to the fifth reference length, and the length of the merge box being greater than or equal to the sixth reference length if the type of the specified object is a second specified type including a passenger vehicle, may cancel the merging based on the width or the length of the merge box being greater than or equal to a seventh reference length if the type of the specified object is a third specified type including a pedestrian, and may cancel the merging based on the width or the length of the merge box being greater than or equal to the sixth reference length if the type of the specified object is not identified.

According to an example of the present disclosure, a vehicle control method may include generating a tracking box by converting a virtual box of a first time point to a virtual box of a second time point after the first time point based on obtaining the virtual box of the first time point corresponding to a specified object at the first time point through a LiDAR, identifying virtual boxes associated with the tracking box among virtual boxes at the second time point, based on obtaining the virtual boxes at the second time point formed by a plurality of points obtained at the second time point through the LiDAR, merging all or part of the associated virtual boxes based on at least one of a distance between the virtual boxes of the second time point, whether at least one of the virtual boxes of the second time point corresponds to an object separated from a road edge, whether the virtual boxes of the second time point are included in the tracking box, or a combination of the distance between the virtual boxes of the second time point, whether at least one of the virtual boxes of the second time point corresponds to the object separated from the road edge, and whether the virtual boxes of the second time point are included in the tracking box, and maintaining or canceling the merging based on at least one of a size of a merge box generated by the merging, a difference between the size of the merge box and a size based on the associated virtual boxes, a type of the specified object, or a combination of the size of the merge box, the difference between the size of the merge box and the size based on the associated virtual boxes, and the type of the specified object.

According to an example, the vehicle control method may further include identifying the virtual boxes associated with the tracking box among the virtual boxes of the second time point based on a fact that the tracking box overlaps each of the virtual boxes of the second time point by a specified ratio or more, or a distance between a plurality of first points included in the tracking box and a plurality of second points included in the virtual boxes of the second time point is identified as being within a correlation distance.

According to an example, the vehicle control method may further include identifying a stationary or a moving state of the specified object based on a fact that the specified object is not occluded, the type of the specified object is identified as a first specified type including a pedestrian, and the number of the virtual boxes of the second time point is smaller than a specified number.

According to an example, the vehicle control method may further include identifying that the specified object is in the stationary state, identifying that at least one of a width or a length of the tracking box is greater than or equal to a first reference length, identifying a first straight line perpendicular to a line segment forming a first virtual box from a first center point of the first virtual box among the virtual boxes of the second time point, based on a fact that the specified object is in the stationary state and at least one of the width or the length of the tracking box is greater than or equal to the first reference length, and not merging the associated virtual boxes based on a fact that a distance between the first straight line and a second center point of a second virtual box among the virtual boxes of the second time point is greater than or equal to a second reference length.

According to an example, the vehicle control method may further include identifying a virtual box having a first identifier indicating that the virtual box is closest to a host vehicle including the vehicle control apparatus and has a width and a length, each of which is greater than or equal to a third reference length, from among the virtual boxes of the second time point, identifying a virtual box, which has a second identifier indicating an object separated from the road edge, from among the virtual boxes of the second time point, and merging the virtual box having the first identifier, and the virtual box having the second identifier.

According to an example, the vehicle control method may further include identifying a virtual box, which does not overlap the tracking box, from among the virtual boxes of the second time point, and merging part of the associated virtual boxes, other than the virtual box thus not overlapped.

According to an example, the vehicle control method may further include identifying at least one of a width of each of the associated virtual boxes, a length of each of the associated virtual boxes, or a combination of the width of each of the associated virtual boxes and the length of each of the associated virtual boxes, comparing a sum of widths of the associated virtual boxes with a width of the tracking box, or comparing a sum of lengths of the associated virtual boxes with a length of the tracking box, and merging the associated virtual boxes based on the sum of the widths of the associated virtual boxes exceeding the width of the tracking box, or the sum of the lengths of the associated virtual boxes exceeding the length of the tracking box.

According to an example, the vehicle control method may further include canceling the merging based on the size of the merge box being greater than or equal to a first reference size, or one of a width and a length of the merge box being greater than or equal to a fourth reference length.

According to an example, the vehicle control method may further include identifying a minimum value on an x-axis, a maximum value on the x-axis, a minimum value on a y-axis, and a maximum value on the y-axis among a plurality of points included in the associated virtual boxes identified on a plane formed by the x-axis and the y-axis among the x-axis, the y-axis, and a z-axis, and canceling the merging based on a fact that a difference between the size of the merge box and a size of a quadrangle formed by the minimum value on the x-axis, the maximum value on the x-axis, the minimum value on the y-axis, and the maximum value on the y-axis is greater than or equal to a second reference size.

According to an example, the vehicle control method may further include identifying that the specified object is in a moving state among a stationary state and the moving state, and the merge box is located in a region in which a specified distance from a boundary of FOV of the LiDAR is exceeded, canceling the merging based on the width of the merge box being greater than or equal to a fifth reference length, or the length of the merge box being greater than or equal to a sixth reference length if the type of the specified object is a first specified type including a specialty vehicle, canceling the merging based on the width of the merge box being greater than or equal to the fifth reference length, and the length of the merge box being greater than or equal to the sixth reference length if the type of the specified object is a second specified type including a passenger vehicle, canceling the merging based on the width or the length of the merge box being greater than or equal to a seventh reference length if the type of the specified object is a third specified type including a pedestrian, and canceling the merging based on the width or the length of the merge box being greater than or equal to the sixth reference length if the type of the specified object is not identified.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, a vehicle control apparatus may merge virtual boxes generated by using a LiDAR or may unmerges the merge box.

Moreover, according to an embodiment of the present disclosure, the vehicle control apparatus may reduce a load of a processor by determining whether to merge virtual boxes before merging the virtual boxes.

Moreover, according to an embodiment of the present disclosure, the vehicle control apparatus may determine whether to merge virtual boxes by using sizes of virtual boxes and a size of a tracking box, or determine whether to cancel the merging by using the sizes of virtual boxes and a size of a merge box and may output the merge box to output a correct merge box, and a method thereof.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:

a sensor; and a processor, wherein the processor is configured to:

generate, based on obtaining a virtual box corresponding to an object at a first time point through the sensor, a tracking box by converting the virtual box to a virtual box at a second time point after the first time point;

determine virtual boxes associated with the tracking box among a plurality of virtual boxes at the second time point, based on obtaining the plurality of virtual boxes at the second time point formed by a plurality of points obtained at the second time point through the sensor;

merge all or part of the determined virtual boxes based on at least one of:

a distance between the plurality of virtual boxes at the second time point, whether at least one of the plurality of virtual boxes at the second time point corresponds to an object separated from a road edge, or whether the plurality of virtual boxes at the second time point are included in the tracking box; and control the merging by determining whether to cancel or maintain the merging based on at least one of:

a size of a merge box generated by the merging, a difference between the size of the merge box and a size based on the determined virtual boxes, or a type of the object; and output a signal indicating the controlled merging.

2. The apparatus of claim 1, wherein the processor is configured to:

determine the virtual boxes associated with the tracking box among the plurality of virtual boxes at the second time point further based on:

the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance; and control the merging based on:

the size of the merge box generated by the merging, the difference between the size of the merge box and the size based on the determined virtual boxes, and the plurality of virtual boxes at the second time point being included in the tracking box.

3. The apparatus of claim 1, wherein the processor is configured to:

determine a stationary state or a moving state of the object based on:

the object being unobstructed, the type of the object being determined as a third type different from a first type including a specialty vehicle, and a number of the plurality of virtual boxes at the second time point being smaller than a specified number.

4. The apparatus of claim 3, wherein the processor is configured to:

determine that the object is in the stationary state;

determine that at least one of a width or a length of the tracking box is greater than or equal to a first reference length;

determine a first straight line perpendicular to a line segment forming a first virtual box from a first center point of the first virtual box among the plurality of virtual boxes at the second time point, based on:

the object being in the stationary state, and at least one of the width or the length of the tracking box being greater than or equal to the first reference length; and skip merging at least a portion of the determined virtual boxes based on a distance between the first straight line and a second center point of a second virtual box among the plurality of virtual boxes at the second time point being greater than or equal to a second reference length.

5. The apparatus of claim 1, wherein the processor is configured to:

determine a virtual box having a first identifier indicating that the virtual box having the first identifier is closest to a vehicle including the apparatus and has a width and a length, each of which is greater than or equal to a third reference length, from among the plurality of virtual boxes at the second time point;

determine a virtual box, which has a second identifier indicating an object separated from the road edge, from among the plurality of virtual boxes at the second time point; and skip merging the virtual box having the first identifier and the virtual box having the second identifier.

6. The apparatus of claim 1, wherein the processor is configured to:

determine a virtual box, which does not overlap the tracking box, from among the plurality of virtual boxes at the second time point; and merge part of the determined virtual boxes, excluding the virtual box that does not overlap the tracking box.

7. The apparatus of claim 1, wherein the processor is configured to:

determine at least one of a width of each of the determined virtual boxes or a length of each of the determined virtual boxes;

compare a sum of widths of the determined virtual boxes with a width of the tracking box, or compare a sum of lengths of the determined virtual boxes with a length of the tracking box; and skip merging the determined virtual boxes based on the sum of the widths of the determined virtual boxes exceeding the width of the tracking box or the sum of the lengths of the determined virtual boxes exceeding the length of the tracking box.

8. The apparatus of claim 1, wherein the processor is configured to:

cancel at least a portion of the merging based on the size of the merge box being greater than or equal to a first reference size or one of a width and a length of the merge box being greater than or equal to a fourth reference length.

9. The apparatus of claim 1, wherein the processor is configured to:

determine a minimum value on an x-axis, a maximum value on the x-axis, a minimum value on a y-axis, and a maximum value on the y-axis among a plurality of points included in the determined virtual boxes determined on a plane formed by the x-axis and the y-axis, wherein the x-axis is a moving direction of the vehicle and the y-axis is perpendicular to the x-axis; and cancel at least a portion of the merging based on a difference between the size of the merge box and a size of a quadrangle formed by the minimum value on the x-axis, the maximum value on the x-axis, the minimum value on the y-axis, and the maximum value on the y-axis being greater than or equal to a second reference size.

10. The apparatus of claim 1, wherein the processor is configured to:

determine that the object is in a moving state among a plurality of states including a stationary state and the moving state, and the merge box is located in a region in which a specified distance from a boundary of field of view of the sensor is exceeded; and cancel at least a portion of the merging based on one of:

a width of the merge box being greater than or equal to a fifth reference length or a length of the merge box being greater than or equal to a sixth reference length when the type of the object is a first type including a specialty vehicle;

the width of the merge box being greater than or equal to the fifth reference length and the length of the merge box being greater than or equal to the sixth reference length when the type of the object is a second type including a passenger vehicle;

the width or the length of the merge box being greater than or equal to a seventh reference length when the type of the object is a third type including a pedestrian; or the width or the length of the merge box being greater than or equal to the sixth reference length when the type of the object is not determined.

11. A method for controlling a vehicle, the method comprising:

generating, by an apparatus and based on obtaining a virtual box corresponding to an object at a first time point through a sensor, a tracking box by converting the virtual box to a virtual box at a second time point after the first time point;

determining virtual boxes associated with the tracking box among a plurality of virtual boxes at the second time point, based on obtaining the plurality of virtual boxes at the second time point formed by a plurality of points obtained at the second time point through the sensor;

merging all or part of the determined virtual boxes based on at least one of:

a distance between the virtual boxes of the second time point, whether at least one of the virtual boxes of the second time point corresponds to an object separated from a road edge, or whether the virtual boxes of the second time point are included in the tracking box; and controlling the merging by determining whether to cancel or maintain the merging based on at least one of:

a size of a merge box generated by the merging, a difference between the size of the merge box and a size based on the determined virtual boxes, or a type of the object; and outputting a signal indicating the controlled merging.

12. The method of claim 11, wherein the determining the virtual boxes associated with the tracking box among the plurality of virtual boxes at the second time point is further based on:

the tracking box overlapping each of the plurality of virtual boxes at the second time point by a specified ratio or more, or a distance between a plurality of first points included in the tracking box and a plurality of second points included in the plurality of virtual boxes at the second time point being within a correlation distance; and wherein controlling the merging is based on:

the size of the merge box generated by the merging, the difference between the size of the merge box and the size based on the determined virtual boxes, and the plurality of virtual boxes at the second time point being included in the tracking box.

13. The method of claim 11, further comprising:

determining a stationary state or a moving state of the object based on:

the object being unobstructed, the type of the object being determined as a first type including a pedestrian, and a number of the plurality of virtual boxes at the second time point being smaller than a specified number.

14. The method of claim 11, further comprising:

determining a virtual box having a first identifier indicating that the virtual box having the first identifier is closest to a vehicle having a width and a length, each of which is greater than or equal to a third reference length, from among the plurality of virtual boxes at the second time point;

determining a virtual box, which has a second identifier indicating an object separated from the road edge, from among the plurality of virtual boxes at the second time point; and merging the virtual box having the first identifier and the virtual box having the second identifier.

15. The method of claim 11, further comprising:

determining a virtual box, which does not overlap the tracking box, from among the plurality of virtual boxes at the second time point; and merging part of the determined virtual boxes, excluding the virtual box that does not overlap the tracking box.

16. The method of claim 11, further comprising:

determining at least one of a width of each of the determined virtual boxes or a length of each of the determined virtual boxes;

comparing a sum of widths of the determined virtual boxes with a width of the tracking box or comparing a sum of lengths of the determined virtual boxes with a length of the tracking box; and merging the determined virtual boxes based on the sum of the widths of the determined virtual boxes exceeding the width of the tracking box or the sum of the lengths of the determined virtual boxes exceeding the length of the tracking box.

17. The method of claim 11, further comprising:

canceling at least a portion of the merging based on the size of the merge box being greater than or equal to a first reference size, or one of a width and a length of the merge box being greater than or equal to a fourth reference length.

18. The method of claim 11, further comprising:

determining a minimum value on an x-axis, a maximum value on the x-axis, a minimum value on a y-axis, and a maximum value on the y-axis among a plurality of points included in the determined virtual boxes determined on a plane formed by the x-axis and the y-axis, wherein the x-axis is a moving direction of the vehicle and the y-axis is perpendicular to the x-axis; and canceling at least a portion of the merging based on a difference between the size of the merge box and a size of a quadrangle formed by the minimum value on the x-axis, the maximum value on the x-axis, the minimum value on the y-axis, and the maximum value on the y-axis being greater than or equal to a second reference size.

19. The method of claim 11, further comprising:

determining that the object is in a moving state among a plurality of states including a stationary state and the moving state, and the merge box is located in a region in which a specified distance from a boundary of field of view of the sensor is exceeded; and canceling at least a portion of the merging based on one of:

a width of the merge box being greater than or equal to a fifth reference length, or a length of the merge box being greater than or equal to a sixth reference length when the type of the object is a first type including a specialty vehicle;

the width of the merge box being greater than or equal to the fifth reference length, and the length of the merge box being greater than or equal to the sixth reference length when the type of the object is a second type including a passenger vehicle;

the width or the length of the merge box being greater than or equal to a seventh reference length when the type of the object is a third type including a pedestrian; or the width or the length of the merge box being greater than or equal to the sixth reference length when the type of the object is not determined.

20. An apparatus for controlling a vehicle, the apparatus comprising:

a sensor; and a processor, wherein the processor is configured to:

generate, based on obtaining a virtual box corresponding to an object at a first time point through the sensor, a tracking box by converting the virtual box to a virtual box at a second time point after the first time point;

determine virtual boxes associated with the tracking box among a plurality of virtual boxes at the second time point, based on obtaining the plurality of virtual boxes at the second time point formed by a plurality of points obtained at the second time point through the sensor;

merge all or part of the determined virtual boxes based on at least one of:

a distance between the plurality of virtual boxes at the second time point, whether at least one of the plurality of virtual boxes at the second time point corresponds to an object separated from a road edge, or whether the plurality of virtual boxes at the second time point are included in the tracking box; and control the merging based on at least one of:

a size of a merge box generated by the merging, or a difference between the size of the merge box and a size based on the determined virtual boxes; and output a signal indicating the controlled merging, wherein controlling the merging comprises determining whether to cancel or maintain the merging.

* * * * *